United States Patent [19]

Braun et al.

[11] Patent Number: 4,560,059
[45] Date of Patent: Dec. 24, 1985

[54] CONVEYOR TROUGH CONSTRUCTION

[75] Inventors: Ernst Braun; Gert Braun, both of Essen-Heisingen, Fed. Rep. of Germany

[73] Assignee: Halbach and Braun Industrieanlagen, Fed. Rep. of Germany

[21] Appl. No.: 582,309

[22] Filed: Feb. 22, 1984

[30] Foreign Application Priority Data

Mar. 4, 1983 [DE] Fed. Rep. of Germany ....... 3307646

[51] Int. Cl.⁴ .............................................. B65G 19/28
[52] U.S. Cl. ...................................... 198/735; 24/573; 403/316; 403/353
[58] Field of Search ................... 198/735; 24/573, 590, 24/591, 453; 403/316, 353, 383

[56] References Cited

U.S. PATENT DOCUMENTS 4,134,489  1/1979  Sabes .............................. 198/735 X
4,307,802  12/1981 Linder .................................. 198/735
4,391,471  7/1983  Hauschopp et al. ........... 198/735 X

FOREIGN PATENT DOCUMENTS 2754613  6/1979  Fed. Rep. of Germany ...... 198/735
1527390  10/1978  United Kingdom ................ 198/735

*Primary Examiner*—Robert J. Spar
*Assistant Examiner*—Jonathan D. Holmes
*Attorney, Agent, or Firm*—McGlew and Tuttle

[57] ABSTRACT

A mechanism for connecting two trough sections of a conveyor trough comprises connecting bolts which have heads on both sides and bridge the joints between the sections and are inserted in receivers which are provided in the section walls and are accessible from the inside of the upper trough portion. The bolt shanks have a rectangular cross section and are inserted through slots which are narrower than the broader side of the bolt shank. Upon inserting, the bolts are turned and arrested in transverse position relative to the insertion slot.

3 Claims, 5 Drawing Figures

CONVEYOR TROUGH CONSTRUCTION

FIELD AND BACKGROUND OF THE INVENTION

This invention relates in general to the construction of conveyors and in particular to a new and useful scraper chain conveyor for use in mining and to a construction for holding the sections of the conveyor together.

In a prior art conveyor trough section connection the connecting bolts are designed as flat hammerhead bolts. The bolt receivers provided in the side walls of the trough have substantially the same cross section as the connecting bolts, and the access slot for inserting the bolt is wide enough to let pass the broad side of the bolt shank and thus to permit the insertion in any position. Consequently, the bolts inserted in the receivers may occupy any position. To fix this position, bores in the bolts and securing pins passing therethrough are provided by which the bolts are arrested in a V recess from the outside of the trough. This V recess further accommodates welded retaining elements which become engaged from below by the bolt heads. This prior art design has several drawbacks. The hammerhead bolts cannot take up the extreme loads resulting form the horizontally and vertically angled positions of the trough sections relative to each other. There is no reasonable backing up of the bolt heads which extend at the outside. An oversizing of the bolt shanks might be provided, however, then the acting forces may damage the retaining elements. Further, the securing of the connecting bolts is quite unsatisfactory, since the fixing pins or screws may be sheared or pressed off. The nonsecured bolts might then easily fall out.

There is also a risk that under the loads resulting from the vertical and horizontal angling of the trough sections, the bolts may simply be pushed out.

SUMMARY OF THE INVENTION

The present invention eliminates these drawbacks.

The invention is directed to a conveyor connection which is suitable for taking up extreme loads and in which the bolts are permanently satisfactorily secured in the bolt receivers.

In accordance with the invention, a conveyor trough construction comprises at least two adjacent trough parts which are locked together by a locking bolt. The trough parts, when they are aligned have a locking recess which extends between them and includes an inner wide portion and an outer entrance portion of smaller size than the inner wide portion. The outer entrance part defines a connecting bolt entrance opening for a connecting bolt which has an enlarged head at each end with a contact rim which is engageable behind a contact shoulder defined in the cross section recess. The connecting bolt has a broad side and a connecting bolt narrow side dimensioned to pass through the entrance portion so that the bolt move into the widened portion of the locking recess. The bolt is rotatable in the widened portion to align its broad side with the entrance portion and prevent withdrawal of the bolt.

Due to the contact rims and contact shoulders, the connecting bolts are always well backed up in the receiver in the zone of the bolts heads, against loads resulting from misalignment between the trough sections. The contact rims substantially reduce the specific surface pressure in the bearing area, even under extreme load conditions. The inventive connecting bolt is therefore capable of transmitting even extremely high forces.

This is true even if coal dust should penetrate into the bolt receiver, since even then the axial and radial play necessary for taking up the strong forces is ensured. Further, the bayonet locking of the connecting bolt in the receiver after turning it through 90° satisfactorily prevents the bolt from being pushed out of the receiver under the extreme pressure conditions in an angled conveyor trough. The provided arresting mechanism is especially effective in this regard since it has to absorb only small forces.

There are still other advantageous features. The contact rims of the connecting bolt may be designed as tapering rims having a centering effect, and/or as convexly rounded rims which ensure under any circumstances a satisfactorily small specific surface pressure between the contacting surfaces. Further, the contact rims may be designed with segmental recesses for the locking against rotation of the bolt. The contact shoulders opposing the contact rims are preferably three quarter-circle surfaces making it possible to easily position the bolt. It is also advisable to provide closing plates covering at least the enlarged portions of the receiver and carrying projections which penetrate into the arresting recesses of the contact rims after the inserted bolt has been turned through about 90° to come into its locking position. The cover plates may be fixed with screws. The plates not only prevent the bolts from turning and thus becoming unlocked, but also prevent coal dust from penetrating into the receiver at least in the zone of the enlargement. Coal dust may further be prevented from penetrating into the receiver by providing overlapping closing plates which cover both the enlargements and the slot extending therebetween and carrying arresting strips protruding up to the broad shank side of the bolt in locking position. If coal dust is prevented from penetrating in the receiver, the initially provided play of the bolt is preserved. But even with a penetration of coal dust into the receiver, the play is maintained to an extent sufficient for taking up even strong forces, especially pressure. It is therefore possible to design the receiver even as a casing which is closed against the outside of the trough and has bottom outlets for coal dust which might have penetrated therein. Since, due to the very satisfactory backing up of the bolt heads, the inventive construction is capable of absorbing even extreme loads by itself, the receiver may also be covered by a housing which will not be exposed to any risk of damages.

The invention offers the advantage that the trough connection is capable of perfectly taking up even extreme loads resulting, for example, from the horizontally or vertically angled extension of the conveyor trough. This capability of the mechanism is due to the design and positioning of the connecting bolts, and their arresting in the receiver while substantially reducing the specific contact pressures. Also, the bolts are well locked and secured in the receivers under any load conditions and prevented from becoming loose. All this is done with relatively simple means and while preserving an easy access from the inside of the upper trough section and leaving the outside of the trough closed, so as to prevent coal dust from penetrating therein.

Accordingly it is an object of the invention to provide an improved conveyor trough assembly which comprises a plurality of trough parts which are aligned and which have a recess defined therein which extends between adjacent parts and includes an entrance portion of the recess which is of a smaller size than the inner widened portion and wherein the parts of the trough are held together by a locking bolt which has a broad side which fits into the wide portion of the recess and a narrow side which permits the bolt to move through the entrance opening, the bolt being rotatable in the widened portion to present the broadened side alongside the entrance opening so that the bolt cannot be withdrawn, and the bolt further including widened head portions which lock behind shoulders formed at each end of the recesses of the associated trough sections.

A further object of the invention is to provide a conveyor trough assembly which is simple in design, rugged in struction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
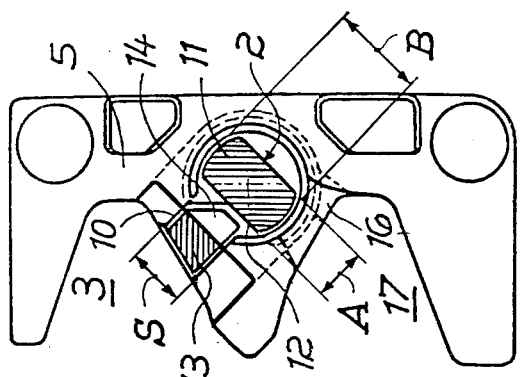
FIG. 1 is a vertical sectional view of the inventive trough connection.
Figure 5:
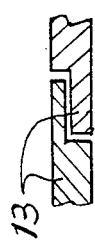
FIG. 5 is a section taken along the line 5—5 of FIG. 4.
Figure 3:
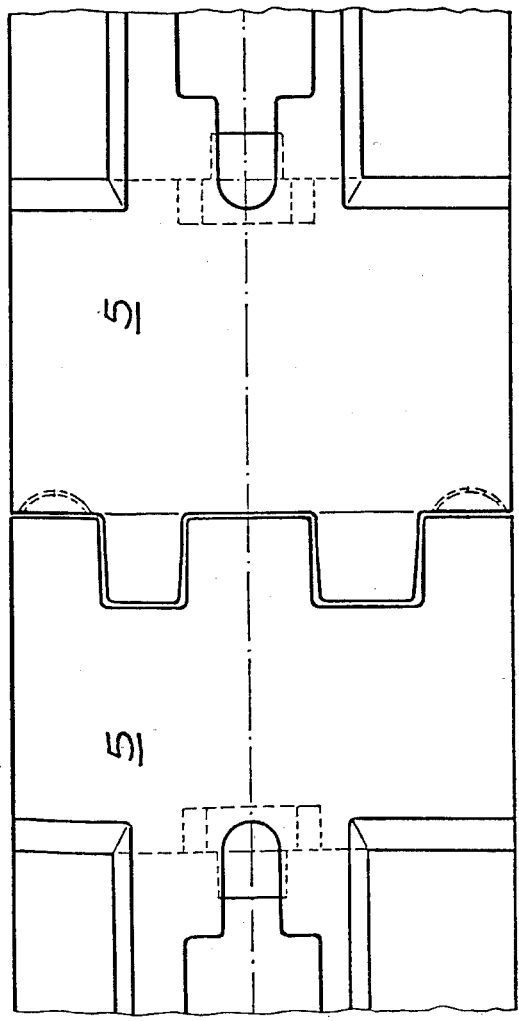
FIG. 3 is a side view of the outside of the trough shown in FIG. 1.
Figure 4:
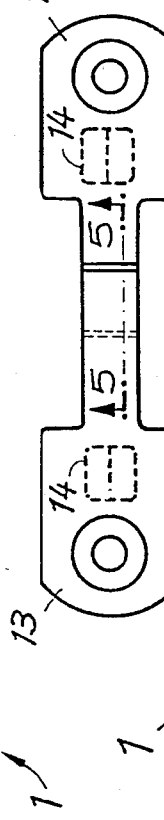
FIG. 4 is a top plan view of the closing plate for the trough comprising projections.
Figure 2:
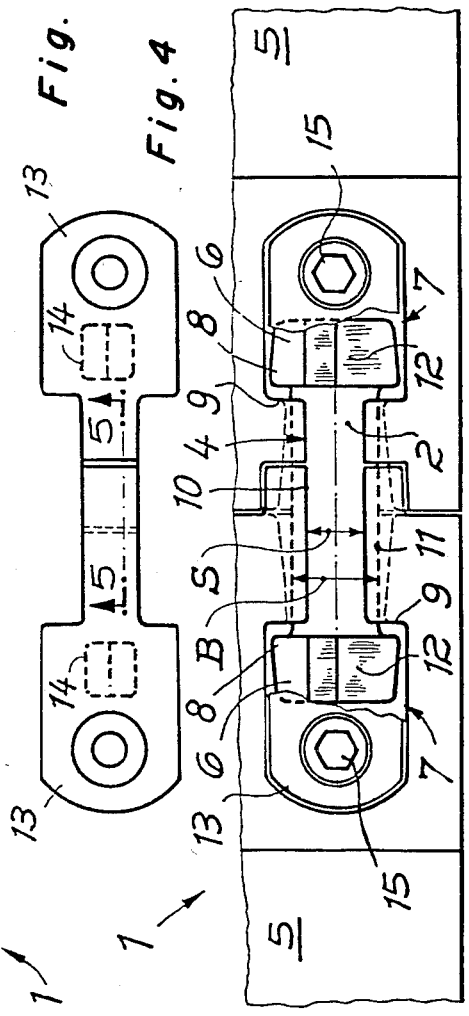
FIG. 2 is a partial front view of the trough.

Referring to the drawings in particular the invention embodied therein comprises a conveyor trough construction which comprises at least two separate trough parts 5, 5 with a locking recess in the parts and extending continuously over a joint area between the parts, from one part to the other and comprising an inner wide portion or receiver 4 and an outer entrance portion or access slot 10 which is of a smaller width than the width of the wide portion and which opens in the outside of the trough into the interior of the wide portion. The receiver 4 has at each end an enlarged end portion or part 7, 7. The trough sections are held together by a connecting or locking bolt 2 having head portions 6 with contact rims 8 which lock behind contact shoulders 9 of the enlarged part 7 of the recesses. The bolts 2 have broad sides with a dimension B which is large enough to permit the bolt to be rotated in the large portion of the recess. The bolt has a narrow side A which permits it to be passed through the access slot 10.

The figures show a trough connection for trough sections 1 especially of chain scraper conveyors. The trough connection substantially comprises connecting bolts 2 by which the joints of adjacent trough sections are bridged, and the bolt receivers 4 provided in side walls 5 of the trough section, with bolts 2 having shanks with a substantially rectangular cross section and enlarged heads 6. Receivers 4 are enlarged at 7 to accommodate the bolt heads, and the bolts 2 can be inserted in the receivers loosely, with an axial play, and fixed in place. Receivers 4 are accessible through the inside of side walls 5 in the upper section 3 of the trough part. The reason for this is that, frequently, outside trough connections are difficult to access because of outside structures secured to the trough walls, while assemblage and maintenance require an easy access.

Bolt heads 6 are formed with a contact rim 8, and enlargements 7 of receivers 4 have corresponding contact shoulders 9. The central portion of receiver 4, connecting enlargements 7, is accessible through slot 10 which is narrower than the broad side B of bolt shank 11 but wider than the narrow side A thereof. Slot 10 has a width S.

Bolt shank 11 is inserted by its narrow side A and then turned through about 90° into a transverse position in which it may be further fixed against rotation. Contact rims 8 of bolt 2 are convex. They may be designed with segmental arresting recesses 12 to be aligned with the broad side of shank 11, thus turned through about 90° relative to the narrow side thereof. The elements securing against rotation engages this recess. Contact shoulders 9 extend through a three quarter circle. The element securing against rotation comprises at least closing plates 13 covering the enlarged portion 7 and carrying arresting projections 14 which protrude into the arresting recesses 12 of contact rims 8. Plates 13 are secured to the side walls of the trough sections by screws or bolts 15. Preferably, overlapping plates 13 are employed which also cover the access slot 10 and are provided with an arresting strip projecting inside against bolt shank 11. Closing plates 13 are flush with the trough wall and close slot 10 and enlargements 7 satisfactorily to obtain a smooth upper surface and an undisturbed operation Closing plates 13 are exchangeable. Receivers 4 are designed as casings which are closed toward the outside of trough walls 5 and have coal dust drain outlets 16 in the lower part 17 of the trough.

While specific embodiments of the invention have been shown and described in detail to illustrate the application of the principles of the invention, it will be understood that the invention may be embodied otherwise without departing from such principles.

What is claimed is:

1. A conveyor trough construction comprising:
two adjacent trough parts (5,5) having a joint area therebetween, each trough part having an upper inner section (3) with a bolt receiver (4) defined in each trough part extending across said joint area and an access slot (10) which is smaller in width than said receiver, communicating said receiver with said upper inner section of said trough parts, said receiver having an enlarged end portion (7) in each trough part communicating with said upper inner section, and a central portion connected between said end portions and extending across said joint area and communicating with said access slot, said trough parts each having a contact shoulder (9) between said end portion and said central portion;
a bolt (2) disposed in said receiver (4) for holding said trough parts together, said bolt having a shank (11) of substantially rectangular cross-section with a wide side (B) which is wider than said slot (10) and a narrow side (A) which is narrower than said slot, said shank being disposed in said central portion of said receiver and being insertable into said central portion through said slot with said narrow side extending across said slot and being rotatable through 90° in said central portion so that said wide side is parallel to the width of said slot, said bolt including an enlarged contact rim (8) connected to each end of said shank (11), each contact rim being disposed in one of said end portions (7) of said receiver and being engageable against said contact shoulder (9) of each trough part (5), each contact rim having an arresting recess (12) having a segment shape and extending in the direction of said wide side of said bolt shank, each contact rim being insertable into each end portion of said receiver and being rotatable with said rotation of said shank to bring said arresting recesses into a position facing said slot in said upper inner section (3) of each trough part; and at least one closing plate (13) secured to said upper inner section for covering said slot (10) and said end portions (7), said closing plate having an enlarged end for covering each end portion and having an outer surface flush with said upper inner section of said trough parts, said closing plate having a projection (14) extending into each arresting recess (12) of each contact rim (8) for preventing rotation of said bolt in said receiver.

2. A construction according to claim 1, wherein said closing plate comprises two separate plates which have a central overlapping area in the vicinity of said joint area between said trough parts and a connecting screw (15) securing each separate plate to each trough part (5) respectively, each connecting screw extending into one of said end portions (7).

3. A construction according to claim 1, wherein each projection (14) has a shape corresponding to the shape of each arresting recess (12).

* * * * *